US009868402B2

(12) United States Patent
Sautter et al.

(10) Patent No.: US 9,868,402 B2
(45) Date of Patent: *Jan. 16, 2018

(54) ATTACHMENT DEVICES FOR VEHICLE ROOFTOP RACK ACCESSORIES

(71) Applicant: Yakima Products, Inc., Lake Oswego, OR (US)

(72) Inventors: Chris Sautter, Portland, OR (US); Victor Rogers, Portland, OR (US); John Mark Elliott, Beaverton, OR (US); Gian-Marco D'Angelo, Portland, OR (US)

(73) Assignee: Yakina Products, Inc., Lake Oswego, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/069,902

(22) Filed: Mar. 14, 2016

(65) Prior Publication Data

US 2016/0362053 A1     Dec. 15, 2016

Related U.S. Application Data

(63) Continuation of application No. 13/874,248, filed on Apr. 30, 2013, now Pat. No. 9,283,884.

(60) Provisional application No. 61/640,633, filed on Apr. 30, 2012.

(51) Int. Cl.
*B60R 9/04* (2006.01)
*B60R 9/052* (2006.01)
*B60P 7/06* (2006.01)

(52) U.S. Cl.
CPC .................. *B60R 9/04* (2013.01); *B60P 7/06* (2013.01); *B60R 9/052* (2013.01); *Y10T 24/2175* (2015.01)

(58) Field of Classification Search
CPC ........... B60R 9/048; B60R 9/10; B60R 9/045; B60R 9/052; B60R 7/06; Y10T 24/2175
See application file for complete search history.

(56) References Cited

U.S. PATENT DOCUMENTS

| | | | | |
|---|---|---|---|---|
| 4,678,147 A | * | 7/1987 | Barnes | F16L 3/22 24/279 |
| 6,793,186 B2 | * | 9/2004 | Pedersen | B60R 9/048 224/309 |
| 8,297,570 B2 | * | 10/2012 | Noyes | B60R 9/045 224/319 |

* cited by examiner

*Primary Examiner* — Corey Skurdal
(74) *Attorney, Agent, or Firm* — Kolisch Hartwell, P.C.

(57) ABSTRACT

Rack systems are disclosed for coupling accessories to crossbars on top of a vehicle. A coupling device may include a flexible strap member adjustably anchored at one end of a body. The strap member may be connected to the other end of the body and tightened. A mounting assembly may be provided on the top side of the body for connection to a cargo-specific carrier or accessory. A coupling device may also include a flexible fitting member configured to grip a round or rectangular crossbar. A cap member may be configured to be mounted on the fitting member and have one or more ramp surfaces which form a sliding interface with a corresponding surface on the fitting member, thereby providing a closing or tightening effect on the fitting member with respect to the crossbar.

Other coupling devices are configured to grip or clamp a t-slot in the crossbar.

9 Claims, 10 Drawing Sheets

ATTACHMENT DEVICES FOR VEHICLE ROOFTOP RACK ACCESSORIES

CROSS-REFERENCES TO RELATED APPLICATIONS

This application is a continuation of U.S. patent application Ser. No. 13/874,248, filed Apr. 30, 2013, which claims priority from U.S. Provisional Patent Application Ser. No. 61/640,633, filed Apr. 30, 2012. The complete disclosures of each application are hereby incorporated by reference in their entireties for all purposes.

This application also incorporates by reference in its entirety U.S. Pat. No. 8,136,709 issued Mar. 20, 2012.

INTRODUCTION

People frequently carry cargo on vehicles. Specialized racks are available for securing recreational items typically on top or on the rear of vehicles. For example, recreational items can be secured on a pair of crossbars on top of a vehicle with a cargo specific carrier, such as boat, bike, ski/snowboard carrier, or other suitable accessory attachment. Carrying cargo outside the vehicle is a convenient way to increase carrying capacity, particularly considering current trends to drive smaller more fuel efficient vehicles, and particularly with respect to inherently large items that usually don't fit well inside a vehicle, for example, boats, bikes, skis, and surfboards.

SUMMARY

Clamp systems are disclosed for coupling rack accessories to crossbars on top of a vehicle. A clamp device may include a body having a top side, a bottom side, a first end portion, and a second end portion. A flexible strap member may be connected to the first end portion of the body, and may have an adjustable effective length for gripping a crossbar.

Another clamp device may include a flexible plastic fitting member having an inner wall defining an aperture for receiving a crossbar. The fitting member may have opposing end portions, and an orientation with the end portions defining a gap having a width dimension which is decreased as the fitting members tighten around a crossbar. A cap member may be configured to engage the fitting member. The cap member may have an internal ramp surface configured to slide relative to one or more external ramp surfaces provided on the fitting member, causing a decrease in the width dimension of the gap, and corresponding tightening of the clamp device around the crossbar.

Other clamp devices provide various mechanisms for securing an enlarged head portion of a bolt in a t-slot of a crossbar.

DETAILED DESCRIPTION

Figure 1:
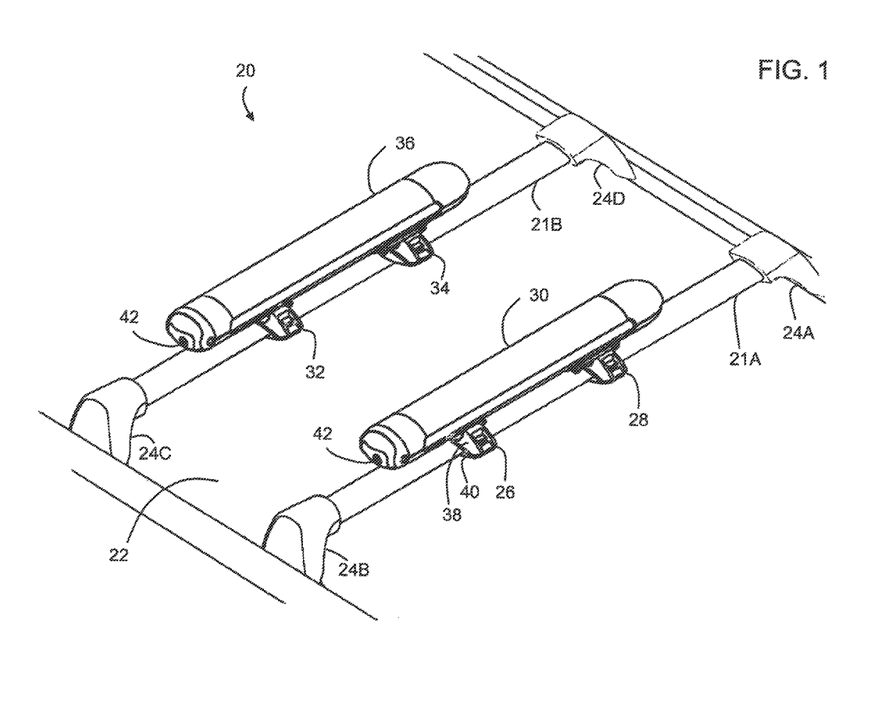
FIG. 1 is a perspective view of a cargo rack mounted on a vehicle, according to the present disclosure.

FIG. 1 shows a cargo rack 20 mounted to a vehicle 22. As shown, cargo rack 20 includes a pair of crossbars 21a, 21b mounted to a roof of vehicle 22 by towers 24a-d. Attachment devices, such as strap couplers 26 and 28, couple a cargo specific carrier, such as ski carrier 30, to crossbar 21a, and strap couplers 32 and 34 couple a cargo specific carrier, such as ski carrier 36, to crossbar 21b. Strap couplers 26, 28, 32, and 34 may be substantially similar in structure, and may be suitable for attachment to crossbars of a variety of shapes and sizes. For example, FIG. 1 shows each strap coupler having a body 38 positioned on an upper surface of a crossbar, and a retention strap 40 for securing body 38 to the crossbar.

Cargo specific carriers 30 and 36 may be operable between a gripping mode that grips a specific type of cargo (e.g., skis), and an unloading mode that allows for the specific type of cargo to be unloaded from the cargo specific carrier. FIG. 1 shows cargo specific carriers 30 and 36 in the gripping mode. As shown, cargo specific carriers 30 and 36 each include a lock assembly 42 configured to lock the associated cargo specific carrier in the gripping mode.

Figure 2:
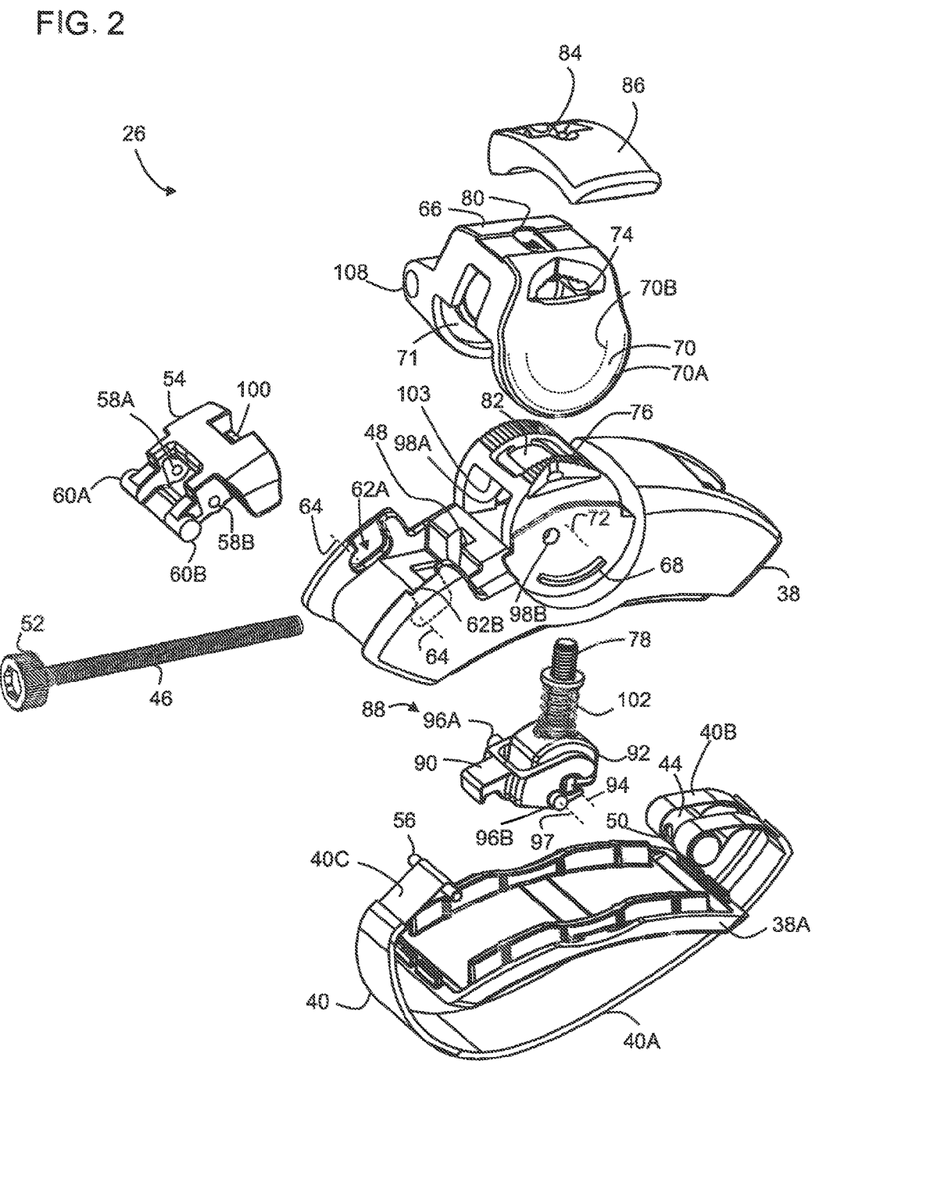
FIG. 2 is an exploded view of a strap coupler.

FIG. 2 shows an exploded view of strap coupler 26. Body 38 may include a lower housing portion 38a configured positioning on a crossbar (not shown) opposite a middle portion 40a of retention strap 40. Lower housing portion 38a may be made of rubber or any other material suitable for gripping the crossbar. Retention strap 40 may include a metal strap (e.g., a strap made of stainless steel) that is coated with rubber and/or a material similar to, or the same as, the material of lower housing portion 38a.

Strap coupler 26 may include any suitable apparatus for adjusting an effective length of retention strap 40 to tension and relax retention strap 40 around the crossbar. For example, FIG. 2 shows a traveling nut 44 attached to (or firmly holding) a first end portion 40b of retention strap 40. A drive screw 46 may extend through an opening 48 in body 38 and be threaded into an aperture 50 in traveling nut 42. Drive screw 46 may include a thumbscrew or knob 52, which when turned may pull or push traveling nut 44 toward or away from opening 48 to respectively shorten or lengthen the effective length of retention strap 40.

A second end portion 40c of retention strap 40 may be removably connected to body 38 by a lever apparatus 54. For example, a pin or axle 56 may pivotally connect second end portion 40c of strap 40 to apertures 58a and 58b of lever apparatus 54. Lever apparatus 54 may be configured to be removably and/or pivotally connected to body 38. For example, FIG. 2 shows lever apparatus 54 including opposing protrusions 60a and 60b, which are shaped to be removably inserted into respective slots 62a and 62b of body 38 to form a lever pivot axis 64.

Lever device or apparatus 54 may be configured to finish tightening retention strap 40 around the crossbar. For example, lever apparatus 54 may be operable (or pivotable) about pivot axis 64 between open and closed positions. Pivoting lever apparatus 54 from the open position to the closed position about pivot axis 64 may move retention strap 40 from a released (or loose, or relaxed) position to a retained (or tightened, or tensioned) position to secure body 38 to the crossbar. Moving lever apparatus 54 from the open position to the closed position may involve an over-center action of pin 56, which both tightens and retains retention strap 40 and prevents retention strap 40 from exerting an opening force on lever apparatus 54 toward the open position. In some embodiments, retention strap 40 may exert a closing force on lever apparatus 54 toward the closing position when retention strap 40 is in the retained position and lever apparatus 54 is in the closed position. In the closed position, lever apparatus 54 may mate with body 38 to cover and/or prevent access to thumbscrew 52.

A mounting interface 66 for a cargo specific carrier may be rotatably connected to body 38. For example, a tab 68 may be slidingly engaged in a slot 70 to retain mounting interface 66 on body 38, and allow mounting interface 66 to rotate about an axis 72 located above the crossbar. As shown in FIG. 2, both tab 68 and slot 70 are arcuate, and slot 70 is radially wider than tab 68 to allow for radial displacement of mounting interface 66 to selectively engage teeth 74 disposed inside mounting interface 66 with teeth 76 disposed on body 38. For example, when teeth 74 and 76 are disengaged, tab 68 may slide along a lower surface 70a of slot 70, and when teeth 74 and 76 are engaged, tab 68 may seat against (or be proximate) an upper surface 70b of slot 70. Strap coupler 26 may include a second tab (not shown) similar to tab 68 located opposite tab 68 on body 38. The second tab may be slidingly engaged in a slot 71 just as tab 68 is in slot 70.

An attachment member 78, shown here as a threaded bolt, may extend through an aperture or opening 80 in mounting interface 66 via an opening 82 in body 38. Attachment member 78 may then be threaded into an aperture or threaded nut member 84 of a cam lever 86 disposed inside of the cargo specific carrier, such as ski carrier 30 of FIG. 1.

Strap coupler 26 may include any suitable mechanism for securing lever apparatus 54 in the closed position. For example, attachment member 78 may be connected to a latch mechanism 88 disposed within body 38. As shown in FIG. 2, latch mechanism 88 includes a latch or latch lever 90 pivotally connected to a nut 92 about a pivot axis 94. As shown, attachment member 78 is connected to (or held by) nut 92, and latch 90 includes a pair of opposing protrusions 96a, 96b to pivotally connect latch 90 to body 38 by respective insertion into opposing apertures 98a, 98b in body 38 forming a latch pivot axis 97.

Cam lever 86 may be operable between an open or up position that allows mounting interface 66 to rotate relative to body 38 (e.g., about pivot axis 72), and a closed or down position that secures mounting interface in position on body 38. For example, moving cam lever 86 from the up position to the down position may pull nut 92 toward opening 82 to secure (or engage) teeth 74 of mounting interface 66 in position on teeth 76 of body 38, and may drive latch 90 down onto a catch 100 of lever apparatus 54 to secure lever apparatus 54 in the closed position. When cam lever 86 is in the up position, pivot axis 94 may align with pivot axis 72. When cam lever 86 is in the down position, pivot axis 94 is displaced from pivot axis 72 (e.g., pivoted relative to pivot axis 72, and/or vertically translated relative to pivot axis 72).

As shown in FIG. 2, a biasing assembly 102 is disposed around attachment member 78 to bias mounting interface 66 away from nut 92 and/or body 38. For example, biasing assembly 102 may include a spring and washer, as shown, seated and/or extending between nut 92 and an inner surface (not shown) of mounting interface 66 to bias teeth 74 away from teeth 76, which may allow mounting interface 66 to be rotated about pivot axis 72 when cam lever 86 is in the up position and/or when weight from a cargo specific carrier, such as ski carrier 30, presses down on mounting interface 66. Biasing assembly 102 may exert a downward force on nut 92 to bias pivot axis 94 away from opening 82, which may cause latch 90 to pivot about latch pivot axis 97 such that latch 90 presses against a surface 103 of body 38 when cam lever 86 is in the up position.

Strap coupler 26 may include any structure or apparatus to allow attachment mechanism 78 to pivot about an axis substantially parallel to pivot axis 72. For example, opening 82 is wider than attachment member 78 in a direction horizontally perpendicular to pivot axis 72, as shown, to allow attachment member 78 to pivot about a pivot axis substantially parallel to pivot axis 72 when cam lever 86 is in the up position. As shown in FIG. 2, opening 80 is similarly dimensioned as attachment member 78 in a direction substantially horizontally perpendicular to pivot axis 72, which may cause attachment member 78 to pivot (e.g., about pivot axis 94) with mounting interface 66 when mounting interface 66 is rotated about pivot axis 72.

Strap coupler 26 may include any structure or apparatus configured to allow attachment mechanism 78 to pivot about an axis substantially horizontally perpendicular to pivot axis 72. For example, opening 80 and opening 82 are wider than attachment member 78 in a direction parallel to pivot axis 72, as shown, to allow attachment member 78 to pivot about a pivot axis substantially horizontally perpendicular to pivot axis 72 to allow the cargo specific carrier to be mounted in an angled orientation to the crossbar (see FIG. 8).

Figure 3:
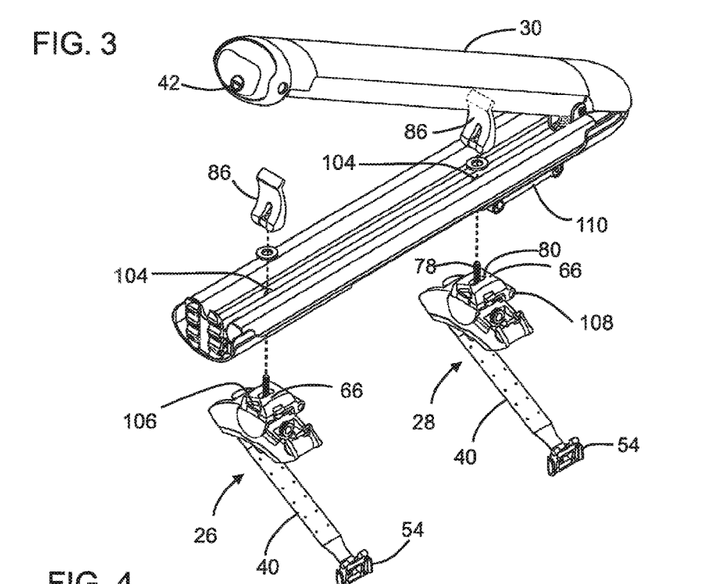
FIGS. 3-4 are perspective views of a cargo specific carrier being coupled to a crossbar with the strap coupler of FIG. 2.
Figure 4:
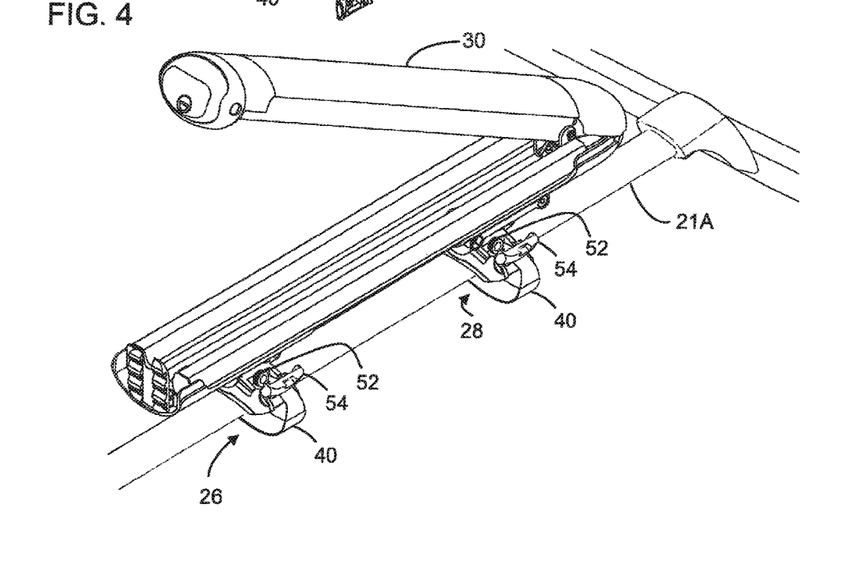

FIGS. 3-4 depict ski carrier 30 being coupled to crossbar 21a with strap couplers 26 and 28, according to the present disclosure. FIGS. 3-4 show ski carrier 30 in the unloading mode. As indicated in FIG. 3, attachment members 78 may be slid through securing apertures 104 in ski carrier 30. Cam levers 86 may then be connected to respective attachment members 78 to loosely couple ski carrier 30 to respective mounting interfaces 66 of strap couplers 26 and 28. In other examples, attachment members 78 may be dropped through ski carrier 30 and threaded into respective nuts 92 in respective strap couplers 26 and 28. As shown, strap couplers 26 and 28 may each include an orienting structure, such as an angled notch 106, which may mate with complimentary structures (not shown) on a bottom surface of ski carrier 30 to assist a user in properly orienting each strap coupler to ski carrier 30, for example in a substantially perpendicular orientation, as shown.

Figure 8:
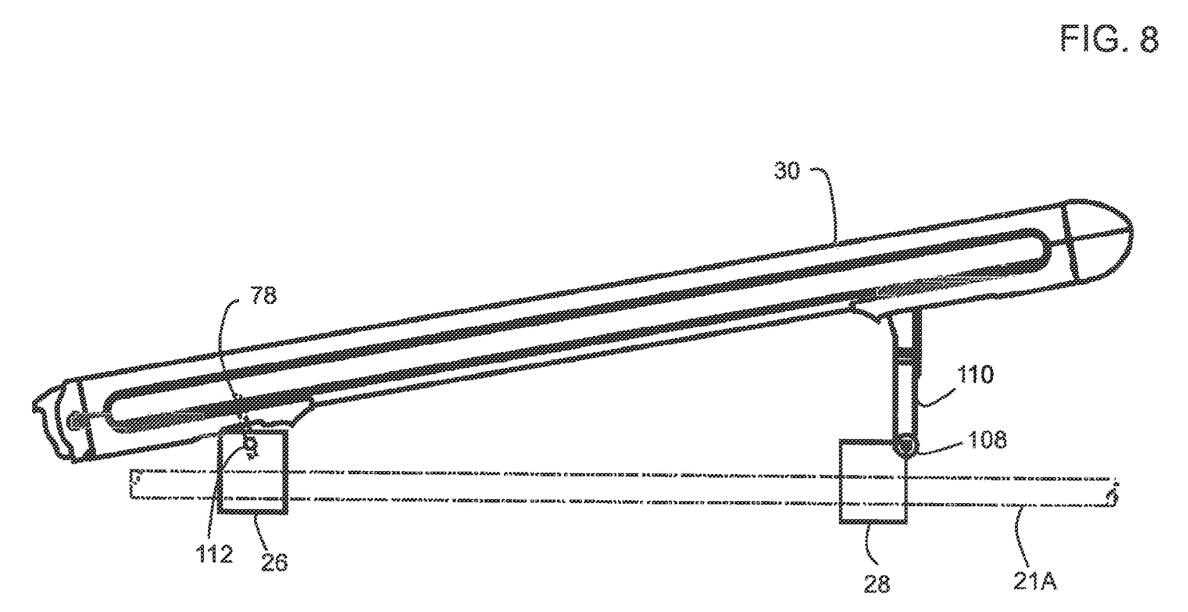
FIG. 8 is a semi-schematic view of the cargo specific carrier of FIGS. 3-4 coupled to the crossbar via a strut.

Strap coupler 28 may include other features and protrusions that allow further attachment interfaces. For example, strap coupler 28 includes an elevator or strut aperture 108, as shown, for coupling ski carrier 30 to strap coupler 28 via an elevator arm or strut 110, which may be selectively pivoted away from ski carrier 30 and secured to aperture 108 with any suitable attachment member, such as a bolt (FIG. 8). As shown, strut aperture 108 is substantially horizontal. The orienting structure may assist in properly orienting strut aperture 108 for subsequent alignment with strut 110 to provide increased clearance between ski carrier 30 and vehicle 22 (see FIG. 8).

As shown in FIG. 3, opening 80 in mounting interface 66 is elongate or oblong in an elongate direction of crossbar 21a (see FIG. 4), which may allow for attachment member 78 to pivot away from vertical in a plane substantially parallel to an elongate or core axis of crossbar 21a to provide for an angled or non-perpendicular (or non-parallel) attachment of ski carrier 30 to strap coupler 26. In other words, oblong opening 80 may allow attachment member 78 to extend from an interior space of strap coupler 26 into an interior space of ski carrier 30 when ski carrier 30 is coupled to crossbar 21a via strut 110. This angled extension of attachment member 78 may allow for an attachment member actuator, such as cam lever 86, to be located inside ski carrier 30, which may provide an increased level of security.

FIG. 4 shows retention straps 40 wrapped around crossbar 21a, and as described, lever apparatus 54 is inserted into respective slots 62a, 62b (see FIG. 2) in strap couplers 26 and 28. Thumbscrews 52 may then be turned to shorten or lengthen the effective length of retention straps 40.

Figure 5:
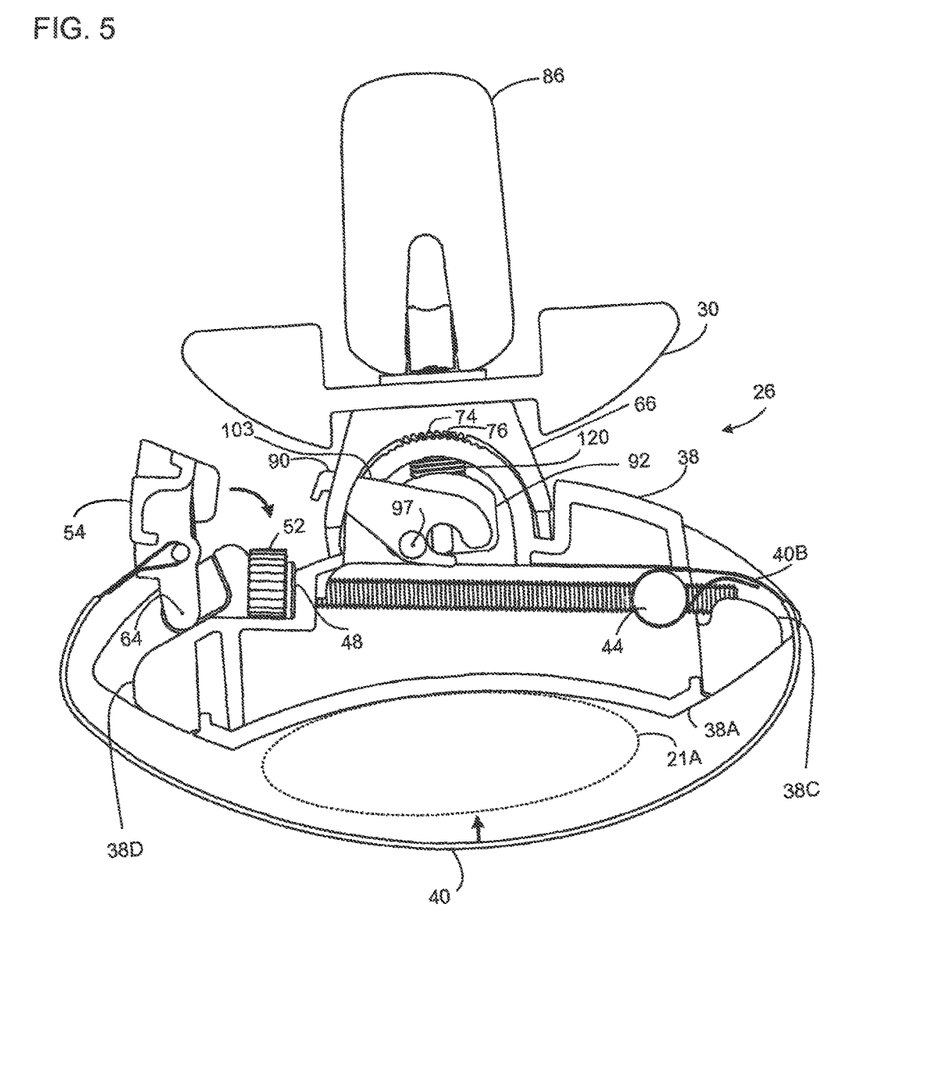
FIG. 5 is a cut away view of the strap coupler of FIG. 2 and a portion of the cargo specific carrier of FIGS. 3-4 with a lever apparatus in an open position and a cam lever in an up position.

FIG. 5 shows a cut away view of strap coupler 26 loosely connected (or coupled) to ski carrier 30 with a top portion of ski carrier 30 removed, lever apparatus 54 in the open position, retention strap 40 in a released position, and cam lever 86 in the up position. As shown, biasing assembly 102 pushes (or biases) nut 92 away from mounting interface 66 to pivot latch 90 about pivot axis 97 so that latch 90 presses against surface 103, which allows biasing assembly 102 to push mounting interface 66 away from body 38 to disengage teeth 74 from teeth 76.

As indicated in FIG. 5, lever apparatus 54 is configured to move retention strap 40 from the released position to the retained position. As described, actuating thumbscrew 52 causes barrel nut 44 and first end portion 40b of retention strap 40 to be pulled toward opening 48, providing a "rough" adjustment of the effective length of retention strap 40. For example, turning thumbscrew 52 may cause retention strap 40 to be pulled against opposing end portions 38c and 38d of body 38 and contact a lower surface of crossbar 21a. Lever apparatus 54 may then be pivoted about pivot axis 64 toward the closed position to cause retention strap 40 to move from the released (or relaxed) position to the retained (or tensioned) position around crossbar 21a (e.g., further tensioning retention strap 40 around crossbar 21a), which secures or clamps crossbar 21a between retention strap 40 and lower housing portion 38a. In other words, moving lever apparatus 54 from the open position to the closed position may finish the tightening (or tensioning) of retention strap 40 around crossbar 21a.

Figure 6:
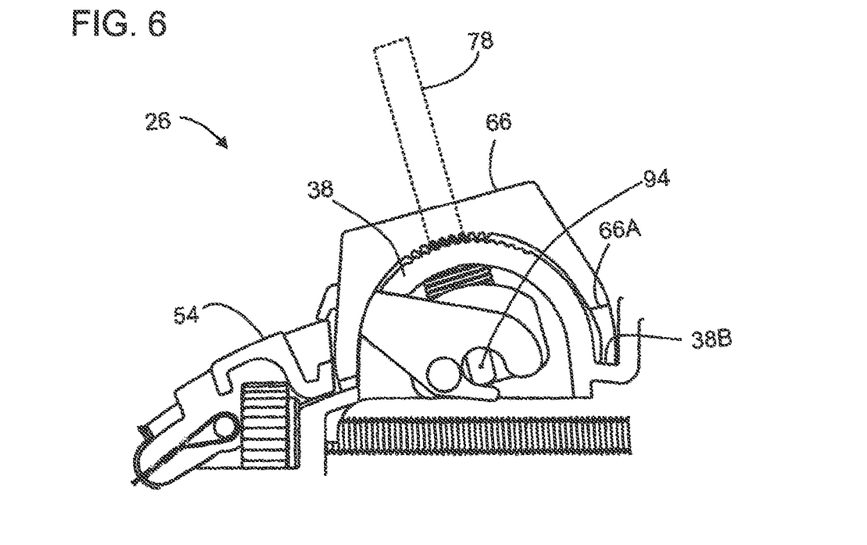
FIG. 6 is a cut away view of a portion of the strap coupler of FIG. 2 with a mounting interface rotated and the lever apparatus in the closed position.

FIG. 6 shows a cut away view of a portion of strap coupler 26 with lever apparatus 54 in the closed position. As shown, mounting interface 66 is selectively rotated relative to body 38, which may be desirable when coupling a cargo specific carrier to a crossbar with an angled pitch, as described in U.S. Pat. No. 8,136,709 B2 assigned to Applicants, which is hereby incorporated by reference.

FIG. 6 shows mounting interface 66 and attachment member 78 selectively pivoted counter-clockwise. Alternatively, mounting interface 66 may be selectively pivoted clockwise. For example, mounting interface 66 may be pivoted clockwise until a lower surface 66a of mounting interface 66 contacts an upper surface 38b of body 38. As shown, the pivot axis (e.g., pivot axis 94) for mounting interface 66 is located above the crossbar, which may provide greater flexibility in coupling a cargo specific carrier to a pitched or angled crossbar as compared to a mounting interface having a pivot axis located below the crossbar. For example, mounting interface 66 may have a 20 degree range of pivotation relative to body 38 to provide a horizontally oriented mounting interface 66 when strap coupler 26 is mounted on a pitched crossbar.

Figure 7:
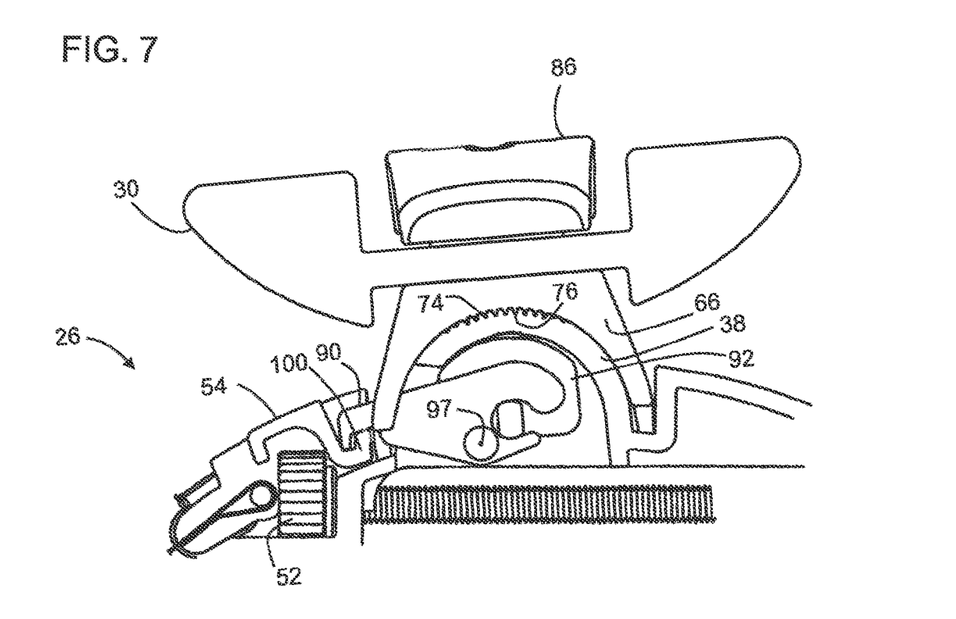
FIG. 7 is a cut away view of a portion of the strap coupler of FIG. 2 and a portion of the cargo specific carrier of FIGS. 3-4 with the cam lever in a down position.

FIG. 7 shows a cut away view of a portion of strap coupler 26 and a portion of ski carrier 30 with cam lever 86 in the down position. As shown, moving cam lever 86 to the down position pulls up nut 92 via attachment member 78 (see FIG. 2), which pivots latch 90 about latch pivot axis 97 onto catch 100 to secure lever apparatus 54 in the closed position and clamp body 38 between nut 92 and mounting interface 66 to engage teeth 74 and 76. As shown in FIG. 7, lever apparatus 54 substantially houses and/or prevents access to knob 52 when in the closed position.

Ski carrier 30 may then be moved to the gripping mode, and lock assembly 42 (see FIG. 1) may be locked to indirectly lock strap coupler 26 in the retained position. For example, locking lock assembly 42 may prevent ski carrier 30 from being opened, which may prevent a third party from actuating strap coupler 26 to the released position and/or removing ski carrier 30 from the crossbar (e.g., when ski carrier 30 is locked in the gripping mode, cam lever 86 is inaccessible, thus indirectly locking latch 90 in position on catch 100).

FIG. 8 is a semi-schematic diagram of ski carrier 30 coupled to crossbar 21a with strap coupler 26 and strap coupler 28 via strut 110. As shown, an end portion of strut 110 is pivoted away from ski carrier 30 and connected to aperture 108 (see FIG. 2) of strap coupler 28 to provide additional clearance between ski carrier 30 and the vehicle roof (see FIG. 1), for example, to provide additional clearance for "tall" snowboard bindings. As shown, oblong opening 80 (see FIG. 2) allows attachment member 78 to pivot about pivot axis 112, so that attachment member 78 extends non-perpendicularly (e.g. away from vertical) from inside strap coupler 22 to inside ski carrier 30 where an actuator, such as cam lever 86 (see FIG. 7) or a threaded nut member, may secure ski carrier 30 to strap coupler 26. As shown, pivot axis 112 is normal to the view of FIG. 8, perpendicular to the elongate direction of crossbar 21a, and horizontally perpendicular to pivot axis 94 of attachment member 78 (see FIG. 6). In other words, attachment member 78 may pivot about a first pivot axis (e.g., pivot axis 94) that is substantially parallel to the elongate direction of the crossbar, and about a second pivot axis (e.g., pivot axis 112) that is substantially horizontally perpendicular to the first pivot axis.

FIGS. 9-12 show an example of an attachment device or clamp or coupler 200 that is suitable for being selectively attached to either a round or square or rectangular crossbar for coupling a cargo specific carrier or rack accessory to the selected crossbar. As shown, clamp 200 includes a fitting member 202 coupled to an attachment or bolt member 204, and a cap or cap member 206 dimensioned to fit over fitting member 202. As shown, cap 206 is a generally cubic block and includes a hole or central aperture 208 and a mounting interface 210. In other embodiments, cap 206 may have other external shapes.

Figures 12, 13A:
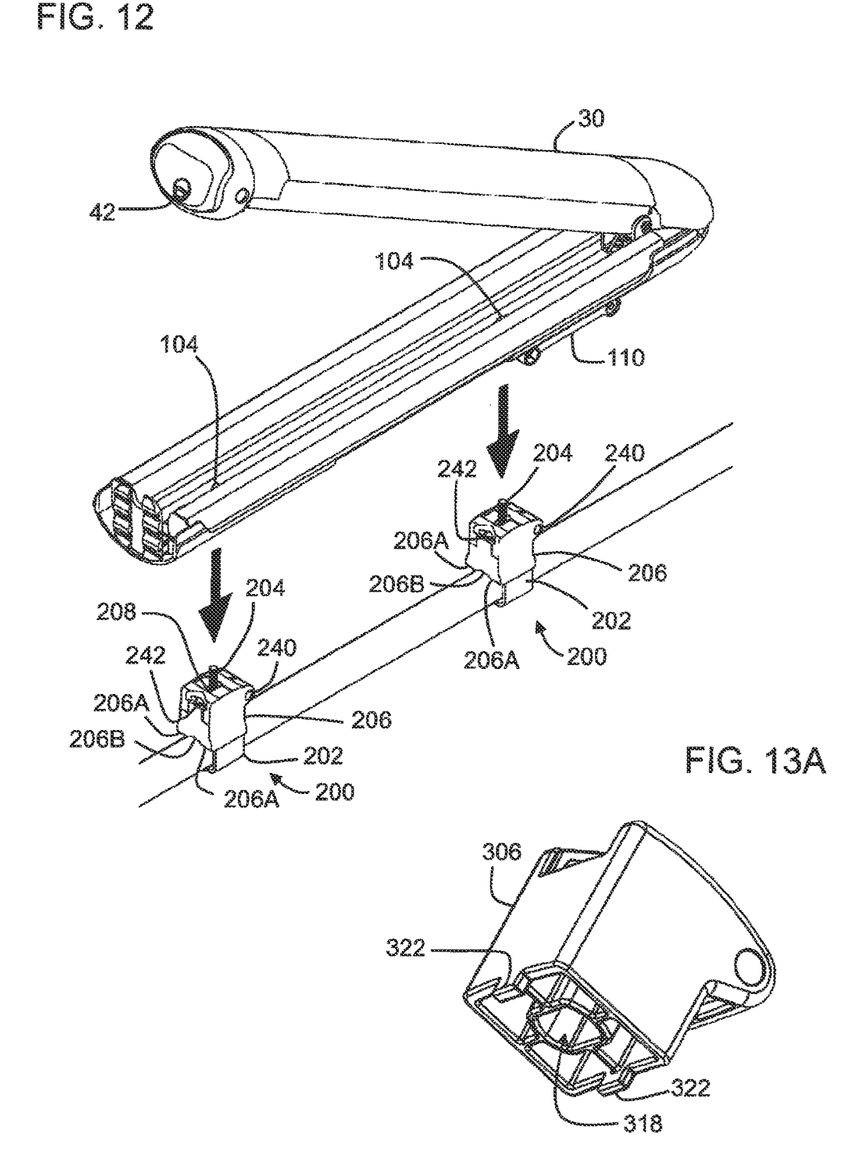
FIG. 12 is a perspective view of the cargo specific carrier being coupled to a crossbar with two of the couplers of FIG. 9.
FIG. 13A is a perspective bottom view of a cap portion of the coupler of FIG. 13.

When cap 206 is fit over fitting member 202, attachment member 204 is received through central aperture 208 in cap 206 to extend above mounting interface 210 for subsequent insertion into the cargo specific carrier, as indicated in FIG.

Figure 11:
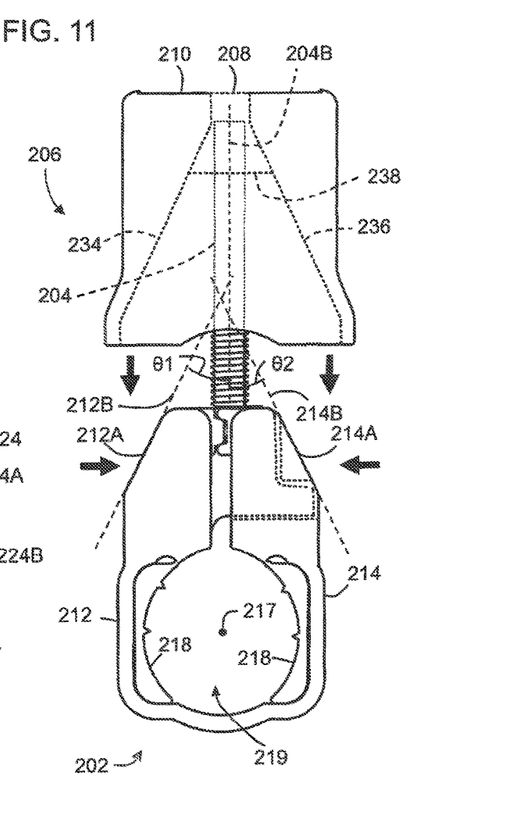
FIG. 11 is a side view of a cap for mounting over the fitting member of FIG. 10 in a wrapped position.

12. Fitting or mounting cap 206 over fitting member 202 presses together first and second jaws 212 and 214 of fitting member 202 to secure fitting member 202 to the crossbar (e.g., between jaws 212 and 214), as indicated in FIG. 11. Coupling ski carrier 30 to the crossbar with coupler 200 may provide additional clearance between the carrier and the vehicle. For example, cap 206 may "raise" a mounted position of the carrier.

Figure 9:
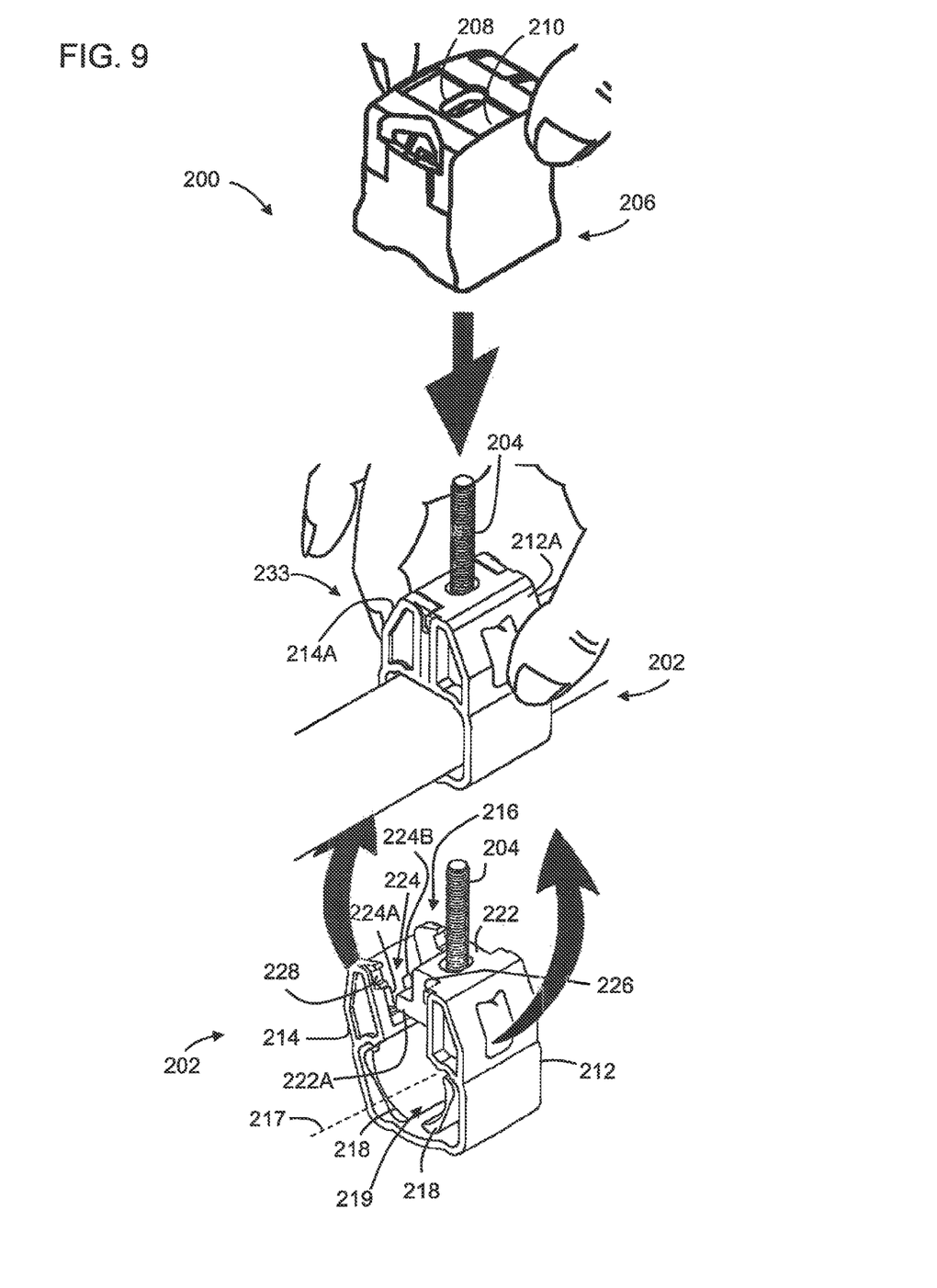
FIG. 9 is a perspective view of a coupler suitable for being selectively attached to either a round or square crossbar.
Figure 10:
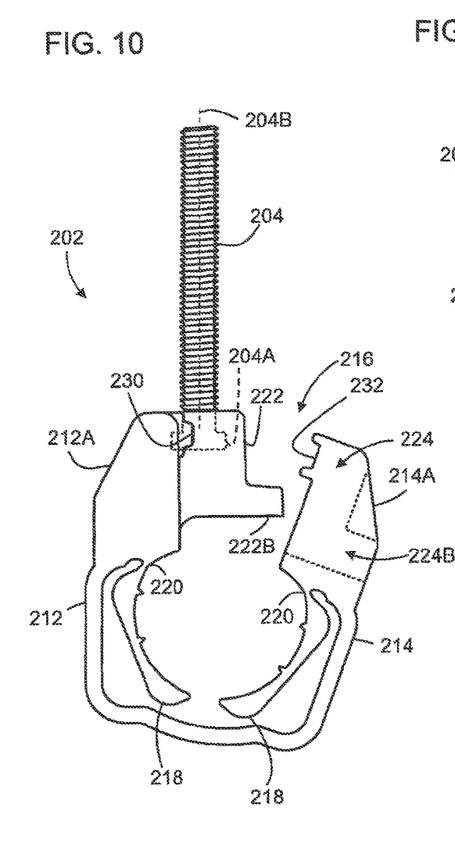
FIG. 10 is a side view of a fitting member of the coupler of FIG. 9 in an open position.

As shown in FIGS. 9-11, fitting member 202 is a flexible "C" shaped member having a generally rounded square inner profile with first and second jaws 212 and 214 forming a mouth or gap 216 of the C. For purposes of this description, mouth 216 shall be referred to as being at the top or upper side of the device.

Fitting member 202 may be a flexible plastic fitting member having an inner wall defining an aperture 219 for receiving the crossbar. As shown in FIGS. 9 and 11, a clamping axis 217 is defined through the center of aperture 219 for receiving the crossbar, and is parallel with the inner wall of fitting member 202. Fitting member 202 has opposing end portions (e.g., upper portions of jaws 212 and 214), and an orientation with the end portions defining gap 216, as shown in FIGS. 9 and 10. As shown, gap 216 has a width dimension which is decreased as fitting member 202 is tightened around the crossbar.

As indicated in FIG. 9, fitting member 202 is operable between an open position (shown here below the crossbar) and a wrapped position (shown here on the crossbar). Fitting member 202 may be made of unfilled nylon or similar resin so that mouth 216 may be spread open (e.g., to the open position). Fitting member 202 may then be wrapped around the crossbar (e.g., in the wrapped position).

As shown, fitting member 202 includes inner adapter pieces or removable flanges 218 that adapt the generally square inner profile to a generally round profile (see FIG. 11) for use on round crossbars (e.g., a crossbar having a round cross-section). Alternatively, adapter pieces 218 may be selectively removed. For example, adapter pieces 218 may be torn or cut out at points 220 (see FIG. 10) to secure coupler 200 to a square or rectangular crossbar (e.g., a crossbar having a square or rectangular cross-section), as described in U.S. Pat. No. 6,422,441 assigned to Applicants, which is hereby incorporated by reference. For example, aperture 219 containing removable flanges 218 conforms to a round crossbar, as shown in FIG. 11, and removal of flanges 218 renders aperture 219 conformable to a square or rectangular crossbar. FIG. 9 shows adapter pieces 218 removed in the wrapped position.

As shown in FIG. 9, first jaw 212 includes a central protruding tab 222 configured to interface with a complementary opening or recess 224 in second jaw 214. Central protruding tab 222 may include a plurality of smaller protruding arms configured to interface with complementary apertures in recess 224. For example, a first protruding arm 222a may interface with and extend into a complementary aperture 224a, and a second protruding arm 222b (see FIG. 10), which is similar to protruding arm 222a, may interface with and extend into a complimentary aperture 224b (see FIGS. 9-10). As shown, the interface of central protruding tab 222 and complementary recess 224 is located in an interior space of fitting member 202, such that when fitting member 202 is in the wrapped position the interface is substantially enclosed by (or housed in) fitting member 202.

As shown in FIGS. 9-10, fitting member 202 includes one or more exterior protruding tabs configured to interface with one or more complementary recesses on opposing exterior surfaces of fitting member 202. For example, FIG. 9 shows first jaw 212 including an exterior protruding tab 226 configured to interface with a complementary exterior recess 228, and FIG. 10 shows an opposite exterior side of fitting member 202 having an exterior protruding tab 230 configured to interface with a complementary exterior recess 232. The interface of tabs 222, 226, and 230 with respective recesses 224, 228, and 232 may act to prevent lateral displacement (e.g., displacement in the direction of the elongate direction of the crossbar) when jaws 212 and 214 are brought together in the wrapped position and engaged with cap member 206.

Either jaw may include the features described. For example, second jaw 214 may include central protruding tab 222, and first jaw 212 may include complementary recess 224.

As shown in FIGS. 9-11, first and second jaws 212 and 214 have respective opposingly sloped upper surfaces or external ramp surfaces 212a and 214a, resulting in a tapered wedge of the upper section of fitting member 202 when in the wrapped position. Opposingly sloped upper surfaces 212a and 214a are sloped (or angled) toward an upper portion of attachment member 204 and extend parallel to the elongate direction of the crossbar, as shown in FIG. 9.

As shown in FIGS. 10-11, bolt member 204 has a head 204a seated in gap 216 between the end portions (e.g. upper portions of jaws 212 and 214) of fitting member 202. As shown, bolt member 204 has a core axis 204b extending in a direction perpendicular to clamping axis 217. External ramp surfaces 212a and 214a of fitting member 202 are shown in respective planes 212b and 214b that form respective acute angles θ1 and θ2 with core axis 204b. Clamping axis 217 and planes 212b and 214b are shown normal to the view of FIG. 11. As shown, planes 212b and 214b are intersecting planes.

FIG. 11 shows a side view of cap 206 being fit over fitting member 202 in the wrapped position. As indicated, cap 206 includes opposingly sloped interior surfaces or internal ramp surfaces 234 and 236 complementary to the tapered wedge formed by opposingly sloped upper surfaces 212a and 214a of fitting member 202 such that cap 206 biases (or presses) jaws 212 and 214 toward one another when fit onto fitting member 202 (e.g., when interior surfaces 234 and 236 of cap 206 slide and/or seat against surfaces 212a and 214a of fitting member 202).

Cap member 206 may be configured to engage fitting member 202. For example, one or more of the internal ramp surfaces 234 and 236 may form a sliding interface with one or more external ramp surfaces 212a and 214a of fitting member 202 so that sliding of one or more internal ramp surfaces 234 and 236 relative to one or more external ramp surfaces 212a and 214a causes the width dimension of gap 216 to change. Bolt member 204 may extend through hole 208 when one or more external ramp surfaces 212a and 214a are in contact with one or more internal ramp surfaces 234 and 236. As indicated in FIG. 11, cap 206 includes a substantially horizontal interior surface or one or more ridges 238 extending between (or connecting) sloped interior surfaces 234 and 236 to prevent fitting member 202 from splitting cap 206. For example, one or more ridges 238 may reinforce the biasing force provided by cap 206 on fitting member 202.

FIG. 12 shows two couplers 200 installed on the crossbar. As indicated, ski carrier 30 is then set on top of caps 206, so that attachment members 204 extend through securing apertures 104 in ski carrier 30. Threaded fasteners, or quick release nuts, such as cam levers 86 shown in FIG. 3, may then be connected to attachment members 204 inside ski carrier 30 to secure ski carrier 30 to mounting interfaces 210. In other examples, attachment members 204 (or other suitable attachment members) may be dropped through securing apertures 104 in ski carrier 30 and threaded into respective nuts (or other suitable fasteners) in respective fitting members 202.

When ski carrier 30 is tightened onto mounting interfaces 210 (e.g., via quick release nuts tightened onto attachment members 204, or attachment members tightened into nuts in fitting members 202), caps 206 are pushed down over the tapered wedges of fitting members 202. For example, a threaded nut member may engage a threaded portion of bolt member 204, and rotation of the nut member around bolt member 204 may cause sliding of one or more internal ramp surfaces 234 and 236 relative to one or more external ramp surfaces 212a and 214a and variation of the width dimension of gap 216 (see FIGS. 10-11). Jaws 212 and 214 (or opposing end portions of fitting member 202) are thus pushed together which tightens the respective fitting members 202 around the crossbar. The nut member may include a cam lever, such as cam lever 86 (see FIGS. 2-7), which pivots about an axis perpendicular to core axis 204b of bolt member 204 (see FIG. 11) for adjusting the position of cap member 206 on fitting member 202 and corresponding width dimension of gap 216 (see FIGS. 9-10).

Securing ski carrier 30 to coupler 200 may secure or clamp cap 206 in position between ski carrier 30 and the crossbar. For example, cap 206 may have a flat bottom surface 206a with a central concave region 206b. When secured to a square crossbar, cargo specific carrier 30 may clamp or secure cap 206 in position by pressing (or seating) surface 206a against the crossbar. When secured to a round crossbar, cargo specific carrier 30 may clamp or secure cap 206 in position by pressing (or seating) concave region 206b against the crossbar.

As shown in FIG. 12, cap 206 may include a strut aperture 240 and an orienting structure, such as an angled notch 242, similar to strut aperture 108 and angled notch 106 of strap couplers 26 and 28 (see FIG. 3).

Coupler 200 may be configured to secure ski carrier 30 via strut 110 in an orientation similar to that shown FIG. 8. For example, FIG. 10 shows head portion 204a of attachment member 204 loosely retained in first jaw 210 to allow attachment member 204 to pivot back and forth in an oblong aperture 244 in fitting member 202 and hole 208 in cap 206 (see FIG. 9) about an axis substantially horizontally perpendicular to the crossbar (e.g., similar to pivot axis 112 of attachment member 78 in FIG. 8). As shown in FIGS. 9, 11 and 12, hole 208 in cap member 206 is oblong, and has a long axis parallel to clamping axis 217 of fitting member 202 and perpendicular to core axis 204c of bolt member 204.

Figure 13:
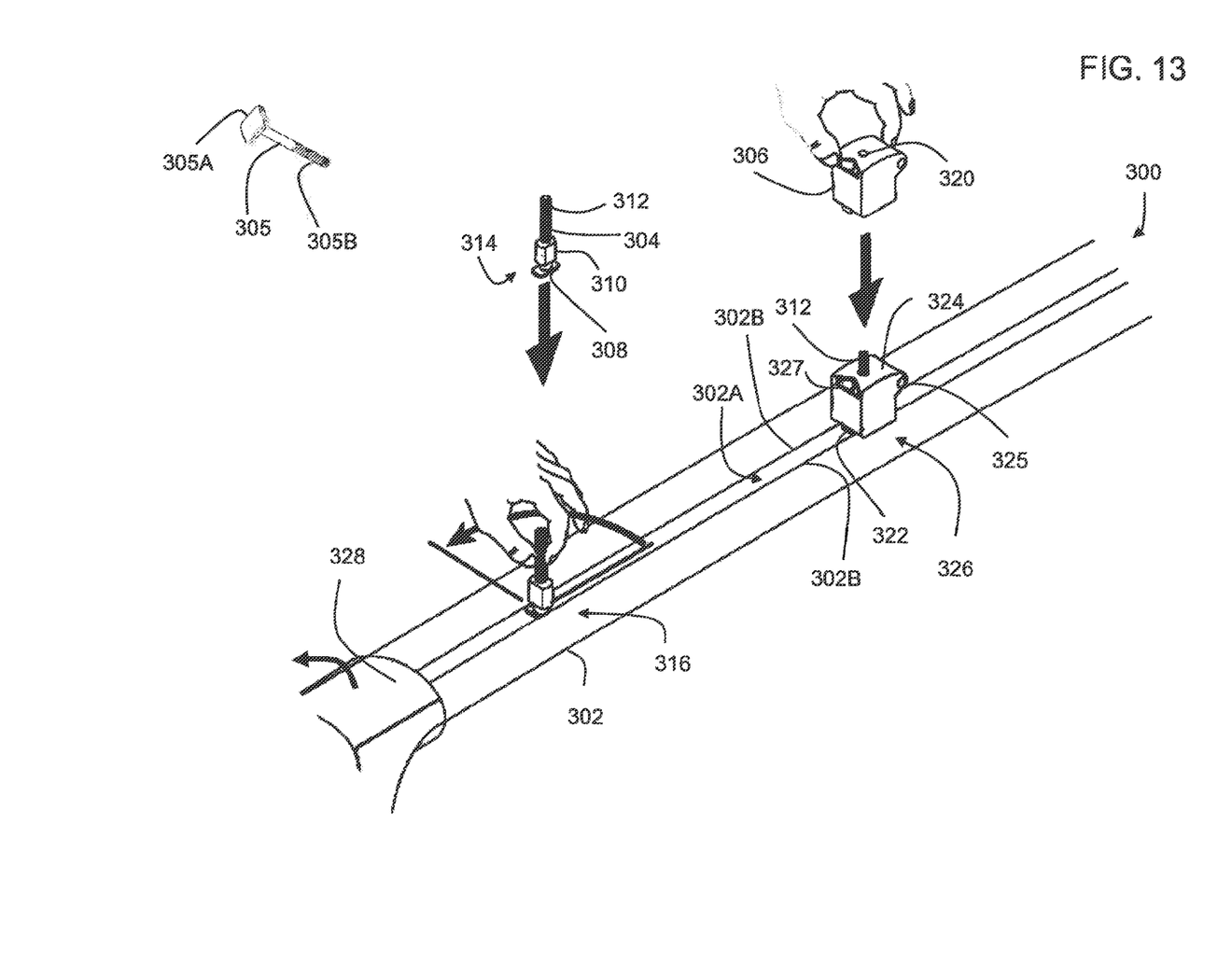
FIG. 13 is a perspective view of a coupler suitable for being attached to a T-slot crossbar.

FIG. 13 shows an example of an attachment device or coupler 300 that is suitable for being attached to a T-slot crossbar, such as crossbar 302, to couple a cargo specific carrier, such as ski carrier 30 (see FIG. 12), to the crossbar. Coupler 300 may include a T-bolt, such as T-bolt 304 or T-bolt 305, and a body (or cap, or block) 306. Coupling ski carrier 30 to the crossbar with coupler 300 may provide additional clearance between the carrier and the vehicle. For example, block 306 may "raise" a mounted position of the carrier.

As shown in FIG. 13, T-bolt 304 is formed as a unitary bolt including a "T" shaped retention cleat 308 protruding from a bottom side of a block portion 310, and a threaded rod or attachment member 312 extending from a top side of block portion 310 opposite the bottom side. T-bolt 304 is shown having a narrow side profile or dimension to facilitate installation in the middle of T-slot 302a. In other words, T-bolt 304 is shown having a side thickness narrow enough to allow T-bolt 304 to pass into T-slot 302a when T-bolt 304 is in a first orientation, generally indicated at 314.

FIG. 13 shows T-bolt 304 having a wider profile in a dimension orthogonal to the side dimension to allow T-bolt 304 to be retained in T-slot 302a when T-bolt 304 is in a second orientation, generally indicated at 316. As shown in FIG. 13, block portion 310 has rounded or otherwise shaped edges in order to allow block portion 310 to be keyed to a correspondingly shaped opening 318 in a lower portion of base 306, as shown in FIG. 13A. Threaded rod portion 312 may be configured to thread into or pass through an aperture 320 in base 306, and further sized and configured to allow threaded attachment of an accessory, such as ski carrier 30 of FIG. 12.

Base 306 may be formed of plastic, and may be generally cube-shaped. As shown in FIGS. 13 and 13A, aperture 320 is a central vertical aperture with a bottom side including shaped opening 318. Base 306 includes one or more alignment tabs 322, and a shaped top section 324 configured to create one or more attachment interfaces for accessories, as shown. For example, an upper surface of block 306 may provide a mounting interface for an accessory attachment, and as shown, shaped top section includes a strut aperture 325 and an angled notch 327 to provide interfaces similar to strut aperture 108 and angled notch 106 of strap couplers 26 and 28 (see FIGS. 2-3, and 8).

Central aperture 320 may be sized to allow threaded rod 312 to pass through base 306 and protrude from top section 324 when T-bolt 304 is inserted through the bottom of base 306. Block portion 310 of T-bolt 304 may be sized and shaped to correspond to opening 318 in the bottom of base 306, as shown, to allow T-bolt 304 to be keyed to base 306 when bolt 304 and base 306 are in a complementary orientation, generally indicated at 326, thus preventing T-bolt 304 from rotating (e.g., to second orientation 314). When in complementary orientation 326, alignment tabs 322 are sized to fit or protrude into T-slot 302a in order to prevent base 306 from rotating out of position.

As indicated in FIG. 13, a process of installing coupler 300 to crossbar 302 includes operatively connecting a T-bolt to T-slot 302a. In a first embodiment, T-bolt 304 is inserted into T-slot 302a in first orientation 314 and rotated (e.g., approximately 90 degrees) to second orientation 316 to retain or operatively connect cleat 308 in or to T-slot 302a. T-slot 302a may be substantially filled with a resilient infill (not shown) which may exert an upward force on cleat 308 in second orientation 316 to press cleat 308 against interior surfaces of T-slot 302a. In a second embodiment, a door 328 may be lifted so that a substantially square cleat 305a of T-bolt 305 may be inserted through an end of T-slot 302a and moved to a select location along T-slot 302a where the resilient infill may operatively connect cleat 305a to T-slot 302a, such that attachment member 305b extends upward from T-slot 302a much like attachment member 312 in second orientation 316.

As indicated, base 306 is then set (or placed) over the T-bolt in orientation 326. A second coupler 300 may be installed on crossbar 302, and a cargo specific carrier, such as ski carrier 30 (see FIG. 12), may be set on top of base(s) 306 so that attachment members 312 (or 305b) extend into ski carrier 30 (e.g., via securing apertures 104). Threaded fasteners (e.g., a nut, knob, or cam lever) may then secure ski carrier 30 to crossbar 302 by pulling up attachment members 312 (or 305b) to secure blocks 306 in position and to provide a clamping force on T-slot 302*a*. For example, longitudinal lips 302*b* of T-slot 302*a* may be clamped between cleats 308 (or 305*a*) and block 306.

The following paragraphs describe exemplary embodiments of the present disclosure:

A. A clamp device for connecting a rack accessory to a crossbar on top of a vehicle comprising a body having a top side, a bottom side, a first end portion, and a second end portion, the bottom side having a padded concave surface for contacting a top side of a crossbar, the top side of the body being configured for connection to a cargo-specific carrier, a flexible strap member connected to the first end portion of the body, the strap member having an effective length and a distal end portion pivotally connected to a lever device including a shaft portion, the second end portion of the body having a dial and a slot for receiving the shaft portion of the lever device, rotation of the dial causing alteration of the effective length of the strap member when the shaft portion is seated in the slot, wherein the lever device is movable between an open position and a closed position, movement of the lever device from the open position to the closed position causing a decrease in the effective length of the strap member.

A1. The clamp device of paragraph A, wherein the movement of the lever device from the open position to the closed position causes blocking of access to the dial.

A2. The clamp device of paragraph A, further comprising a threaded bolt member extending vertically upward from the top side of the body for attachment to a cargo-specific carrier, and a threaded nut member for receiving the bolt member to secure a cargo-specific carrier to the body of the clamp device.

A3. The clamp device of paragraph A1, wherein the body has a rocking portion capable of pivoting around an axis parallel to a crossbar axis when the clamp device is secured around a crossbar.

A4. The clamp device of paragraph A3, further comprising a threaded bolt member extending vertically upward from the rocking portion for attachment to a cargo-specific carrier, and a threaded nut member for receiving the bolt member to secure a cargo-specific carrier to the body of the clamp device, wherein pivotal movement of the rocking portion is prevented when the nut member is tightened on the bolt member.

A5. The clamp device of paragraph A2, wherein the nut member includes a cam lever attached to a barrel nut, wherein final tightening of the nut member to secure a cargo-specific carrier to the body is carried out by pivoting the lever from a clamped position to a released position.

A6. The clamp device of paragraph A3, wherein the rocking portion has an oblong hole with a long axis parallel to a crossbar axis when the clamp device is secured around a crossbar.

A7. The clamp device of paragraph A3, wherein the rocking portion has a latch device catching a recess on the lever device when the lever device is in the closed position and the nut member is securely engaging the bolt member.

A8. The clamp device of paragraph A, wherein the strap member includes a metal band encased in a polymer.

A9. The clamp device of paragraph A2, wherein the nut member is configured to be retained inside a cargo-specific accessory having a locking device.

B. A clamp device for connecting a rack accessory to a crossbar on top of a vehicle comprising a body having a top side, a bottom side, a first end portion, and a second end portion, the bottom side having a padded concave surface for contacting a top side of a crossbar, the top side of the body being configured for connection to a cargo-specific carrier, a flexible strap member connected to the first end portion of the body, the strap member having a distal end portion configured for connection to the second end portion of the body, and a cam lever connected to a bolt member extending upward from the top side of the body, the cam lever being movable between a clamped position and a released position, wherein the distal end of the strap member is prevented from being detached from the second end portion of the body when the cam lever is in the clamped position.

B1. The clamp device of paragraph B, wherein the distal end portion is pivotally connected to a lever device including a shaft portion, the second end portion of the body having a dial and a slot for receiving the shaft portion of the lever device, rotation of the dial causing alteration of an effective length of the strap member when the shaft portion is seated in the slot, the lever device being movable between an open position and a closed position, movement of the lever device from the open position to the closed position causing a decrease in the effective length of the strap member.

B2. The clamp device of paragraph B, wherein the body has a rocking portion capable of pivoting around an axis parallel to a crossbar axis when the clamp device is secured around a crossbar.

C. A clamp device for connecting a rack accessory to a crossbar on top of a vehicle comprising a body having a top side, a bottom side, a first end portion, and a second end portion, the bottom side having a padded concave surface for contacting a top side of a crossbar, the top side of the body being configured for connection to a cargo-specific carrier, a flexible strap member connected to the first end portion of the body, the strap member having an adjustable effective length and a distal end portion pivotally connected to a lever device including a shaft portion, the second end portion of the body having a slot for receiving the shaft portion of the lever device, wherein the lever device is movable between an open position and a closed position, movement of the lever device from the open position to the closed position causing a decrease in the effective length of the strap member, and corresponding tightening of the strap member around a crossbar.

C1. The clamp device of paragraph C, wherein the second end portion of the body had a dial, rotation of the dial causing alteration of the effective length of the strap member when the shaft portion of the lever device is in the slot.

C2. The clamp device of paragraph C1, wherein movement of the lever device from the open position to the closed position causes blocking of access to the dial.

C3. The clamp device of paragraph C, further comprising a threaded bolt member extending vertically upward from the top side of the body for attachment to a cargo-specific carrier, and a threaded nut member for receiving the bolt member to secure a cargo-specific carrier to the body of the clamp device.

C4. The clamp device of paragraph C, wherein the body has a rocking portion capable of pivoting around an axis parallel to a crossbar axis when the clamp device is secured around a crossbar.

C5. The clamp device of paragraph C3, wherein pivotal movement of the rocking portion is prevented when the nut member is tightened on the bolt member.

C6. The clamp device of paragraph C3, wherein the nut member includes a cam lever attached to a barrel nut, wherein final tightening of the nut member to secure a cargo-specific carrier to the body is carried out by pivoting the lever from a clamped position to a released position.

C7. The clamp device of paragraph C4, wherein the rocking portion has an oblong hole with a long axis parallel to a crossbar axis when the clamp device is secured around a crossbar.

C8. The clamp device of paragraph C4, wherein the rocking portion has a latch device catching a recess on the lever device when the lever device is in the closed position and the nut member is securely engaging the bolt member.

C9. The clamp device of paragraph C, wherein the strap member includes a metal band encased in a polymer.

C10. The clamp device of paragraph C3, wherein the nut member is configured to be retained inside a cargo-specific accessory having a locking device.

D. A rack system for carrying recreational equipment comprising a pair of crossbars equipped for mounting on the roof of a vehicle a pair of clamp assemblies, each clamp assembly having a base and a top portion, the base and the top portion being connected by a hinge at one end, the top portion being movable relative to the base, between an open position and a clamped position in which a closed compartment is created between the base and the top portion, each clamp assembly having at least one clamp device for connecting a the clamp assembly to one of the crossbars, each clamp device including a body having a top side, a bottom side, a first end portion, and a second end portion, the bottom side having a padded concave surface for contacting a top side of a crossbar, the top side of the body being configured for connection to the respective clamp assembly, a flexible strap member connected to the first end portion of the body, the strap member having a distal end portion configured for connection to the second end portion of the body, and a cam lever connected to a bolt member extending upward from the top side of the body, the cam lever being movable between a clamped position and a released position, wherein the distal end of the strap member is prevented from being detached from the second end portion of the body when the cam lever is in the clamped position, the cam lever being contained inside the closed compartment of the clamp assembly when the respective clamp assembly is in the clamped position.

E. A clamp device for connecting a rack accessory to a crossbar on top of a vehicle comprising a flexible plastic fitting member having an inner wall defining an aperture for receiving a crossbar, a clamping axis being defined through the center of the aperture parallel with the inner wall of the fitting member, the fitting member having opposing end portions, and an orientation with the end portions defining a gap having a width dimension which is decreased as the fitting member is tightened around a crossbar, a bolt member having a head seated in the gap between the end portions of the fitting member, the bolt member having a core axis extending in a direction perpendicular to the clamping axis, wherein the fitting member has an external ramp surface in a plane that forms an acute angle with the core axis, a cap member configured to engage the fitting member, the cap member having an internal ramp surface configured to form a sliding interface with the external ramp surface so that sliding of the internal ramp surface relative to the external ramp surface causes the width dimension of the gap to change, the cap member also having a hole through which a threaded portion of the bolt member extends when the external ramp surface is in contact with the internal ramp surface, and a threaded nut member for engaging the threaded portion of the bolt member, wherein rotation of the nut member around the bolt member causes sliding of the internal ramp surface relative to the external ramp surface and variation of the width dimension of the gap.

E1. The clamp device of paragraph E, wherein the fitting member has multiple external ramp surfaces.

E2. The clamp device of paragraph A, wherein the fitting member has opposing external ramp surfaces in intersecting planes.

E3. The clamp device of paragraph E, wherein the cap member has multiple internal ramp surfaces.

E4. The clamp device of paragraph E, wherein the cap member has multiple internal ramp surfaces defining one or more planes, each plane forming an acute angle with the core axis.

E5. The clamp device of paragraph E, wherein the nut member includes a cam lever which pivots around an axis perpendicular to the core axis for adjusting the position of the cap member on the fitting member and corresponding width dimension of the gap.

E6. The clamp device of paragraph E, wherein the aperture is configured for gripping a crossbar having a round cross-section.

E7. The clamp device of paragraph E, wherein the aperture is configured for gripping a crossbar having a rectangular cross-section.

E8. The clamp device of paragraph E, wherein the aperture is configured for gripping a crossbar having a square cross-section.

E9. The clamp device of paragraph E, wherein the aperture contains removable flanges conforming to a round crossbar, removal of the flanges rendering the aperture conformable to a square crossbar.

E10. The clamp device of paragraph E, wherein the hole in the cap member is oblong having a long axis perpendicular to the clamping axis and the core axis.

F. A strap coupler for coupling a cargo specific carrier to a crossbar on top of a vehicle, comprising:

a body positioned on the crossbar, the cargo specific carrier being coupled to a mounting interface on the body;

a retention strap configured to secure the body to the crossbar in a retained position and release the body from the crossbar in a released position; and a lock assembly located on the cargo specific carrier capable of indirectly locking the retention strap in the retained position.

F1. The strap coupler of paragraph F, wherein the cargo specific carrier is operable between a gripping mode that grips a specific type of cargo, and an unloading mode that allows for the specific type of cargo to be unloaded from the cargo specific carrier, the lock assembly being configured to indirectly lock the retention strap in the retained position by locking the cargo specific carrier in the gripping mode.

F2. The strap coupler of paragraph F1, wherein the cargo specific carrier is coupled to the mounting interface by an attachment member having an actuator located inside the cargo specific carrier that is inaccessible to a user in the gripping mode.

F3. The strap coupler of paragraph F2, wherein the actuator of the attachment member is operable between an open position that allows the retention strap to be moved to the released position, and a closed position that secures the retention strap in the retained position and prevents the retention strap from moving to the released position.

F4. The strap coupler of paragraph F3, wherein the retention strap has a first end portion firmly held by the body, a middle portion wrapping around the crossbar opposite from the body, and a second end portion connected to a lever apparatus configured to connect the second end portion to the body to operate the retention strap between the released and retained positions, the actuator of the attachment member in the closed position preventing the lever apparatus from moving out of the retained position.

F5. The strap coupler of paragraph F4, wherein operation of the actuator of the attachment member toward the closed position engages a latch mechanism on to the lever apparatus to prevent the lever apparatus from being moved to the released position.

F6. The strap coupler of paragraph F5, wherein operation of the actuator of the attachment member pivots the latch mechanism about a pivot axis disposed within the body of the strap coupler.

G. A strap coupler for connecting a cargo specific carrier to a crossbar on top of a vehicle, comprising:

a body positioned on the crossbar, the body having a mounting interface for the cargo specific carrier; and a retention strap having a first end portion firmly held by the body, a middle portion wrapping around the crossbar opposite from the body, and a second end portion connected to a lever apparatus configured to connect the second end portion to the body to secure the strap coupler to the crossbar.

H. A strap coupler for connecting a cargo specific carrier to a crossbar on top of a vehicle, comprising:

a body positioned on the crossbar, the body having a mounting interface for the cargo specific carrier; and a retention strap having a first end portion firmly held by the body, a middle portion wrapping around the crossbar opposite from the body, and a second end portion connected to a lever apparatus configured to connect the second end portion to the body to secure the strap coupler to the crossbar.

H1. The coupler of paragraph H, wherein the lever apparatus is operable between a closed position that is configured to move the retention strap to a tensioned position to secure the body to the crossbar, and an open position that is configured to move the retention strap to a relax position to release the body from the crossbar.

H2. The coupler of paragraph H, wherein the lever apparatus includes an axle removably inserted into a recess in the body.

H3. The coupler of paragraph H, wherein the lever apparatus secures the second end portion of the strap to the body by being flipped about the axle in an over center action to prevent the retention strap from exerting an opening force on the lever when in the closed position.

H4. The coupler of paragraph H, wherein the first end portion is firmly held by a traveling nut configured to adjust a length of the retention strap by being driven along a drive screw.

H5. The coupler of paragraph H, wherein the lever apparatus prevents access to the drive screw when in the closed position.

H6. The coupler of paragraph H, wherein the cargo specific carrier is connected to the mounting interface by an attachment member having an actuator located inside the cargo specific carrier to secure the cargo specific carrier to the mounting interface, the actuator being configured to secure the lever apparatus in the closed position.

I. A strap coupler for connecting a cargo specific carrier to a crossbar on top of a vehicle, comprising:

a body positioned on the crossbar, the body having a mounting interface for the cargo specific carrier that is pivotable about a pivot axis located above the crossbar; and a retention strap configured to secure the body to the crossbar in a retained position and release the body from the crossbar in a released position.

I1. The coupler of paragraph I, wherein the mounting interface is pivotable about the pivot axis in the retained position.

I2. The coupler of paragraph I, wherein the mounting interface is biased away from a portion of the body by a spring and retained by the portion of the body by a tab slidingly engaged in a slot.

I3. The coupler of paragraph I, wherein securing the cargo specific carrier to the mounting interface prevents pivotation of the mounting interface about the pivot axis.

I4. The coupler of paragraph I, wherein preventing pivotation of the mounting interface about the pivot axis involves engagement of interlocking teeth disposed between the mounting interface and the portion of the body.

I5. The coupler of paragraph I, wherein the pivot axis is parallel to a core axis of the crossbar.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

The various structural members disclosed herein may be constructed from any suitable material, or combination of materials, such as metal, plastic, nylon, plastic, rubber, or any other materials with sufficient structural strength to withstand the loads incurred during use. Materials may be selected based on their durability, flexibility, weight, and/or aesthetic qualities.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A rack for carrying cargo on a vehicle, comprising:
   a cargo-specific carrying assembly configured to secure cargo,
   a clamp device connected to the carrying assembly, configured for connecting carrying assembly to a crossbar mounted on top of a vehicle, the clamp device including:
   (a) a body having a top portion, a bottom portion, a first end portion, and a second end portion, the bottom portion having a padded concave surface for contacting a top side of a crossbar, the top portion of the body connected to the cargo-specific carrying assembly, and
   (b) a flexible strap member connected to the first end portion of the body, the strap member having an effective length and a distal end portion pivotally connected to a lever device including a shaft portion, the second end portion of the body having a dial and a slot for receiving the shaft portion of the lever device, rotation of the dial causing alteration of the effective length of the strap member when the shaft portion is seated in the slot, wherein the lever device is moveable between an open position and a closed position, movement of the lever device from the open position to the closed position causing a decrease in the effective length of the strap member, wherein movement of the lever device from the open position to the closed position causes blocking of access to the dial.

2. The rack of claim 1, wherein the dial is mounted on a threaded rod.

3. The rack of claim 2, wherein the threaded rod has a first end portion and a second end portion, the dial being mounted on the first end portion of the rod, and a barrel nut being mount on the second end portion of the rod.

4. The rack of claim 3, wherein the strap member has a proximal end portion connected to the barrel nut.

5. The rack of claim 1, wherein the shaft of the lever device includes lateral peg portions for engaging slots in opposite side panels of the body.

6. The rack of claim 1, wherein the strap is connected to an intermediate portion of the lever device providing an over-center action when the lever device engages the slot and is moved from the open position to the closed position.

7. The rack of claim 1, further comprising:
   a lock device configured to lock the lever device in the closed position.

8. The rack of claim 1, wherein the strap member is comprised of metal.

9. The rack of claim 8, wherein the strap member is coated with a rubber material.

* * * * *